United States Patent
Vissiere

(10) Patent No.: US 9,513,307 B2
(45) Date of Patent: Dec. 6, 2016

(54) DEVICE AND METHOD FOR DETERMINING THE SPEED OF A WHEELED TERRESTRIAL VEHICLE FROM MEASUREMENTS OF AN AMBIENT TERESTRIAL MAGNETIC FIELD

(75) Inventor: Alain Vissiere, Saint Georges d'Orques (FR)

(73) Assignee: SYSNAV, Aubevoye (FR)

( * ) Notice: Subject to any disclaimer, the term of this patent is extended or adjusted under 35 U.S.C. 154(b) by 698 days.

(21) Appl. No.: 13/133,379

(22) PCT Filed: Dec. 8, 2009

(86) PCT No.: PCT/EP2009/066642
§ 371 (c)(1),
(2), (4) Date: Aug. 12, 2011

(87) PCT Pub. No.: WO2010/066742
PCT Pub. Date: Jun. 17, 2010

(65) Prior Publication Data
US 2011/0291648 A1    Dec. 1, 2011

(30) Foreign Application Priority Data
Dec. 9, 2008   (FR) ..................... 08 58386

(51) Int. Cl.
*G01B 7/30* (2006.01)
*G01P 3/481* (2006.01)

(52) U.S. Cl.
CPC ..................... *G01P 3/481* (2013.01)

(58) Field of Classification Search
CPC .................................................. G01P 3/481
USPC ........................................................ 324/166
See application file for complete search history.

(56) References Cited

U.S. PATENT DOCUMENTS

| | | | |
|---|---|---|---|
| 4,383,303 A * | 5/1983 | Hoffman | 702/147 |
| 6,404,182 B1 * | 6/2002 | Kawase et al. | 324/173 |
| 7,583,200 B2 * | 9/2009 | Gerez | 340/679 |
| 2005/0093539 A1 | 5/2005 | Salfelner | |
| 2006/0152212 A1 * | 7/2006 | Beranger | B60C 23/0488 324/165 |
| 2008/0053245 A1 | 3/2008 | Yao | |
| 2011/0082663 A1 * | 4/2011 | Geisler et al. | 702/141 |

FOREIGN PATENT DOCUMENTS

WO    WO 2004/110793 A2    12/2004

* cited by examiner

*Primary Examiner* — Jay Patidar
(74) *Attorney, Agent, or Firm* — Blakely Sokoloff Taylor & Zafman LLP

(57) ABSTRACT

A device for measuring the speed of movement of a wheeled terrestrial vehicle. A magnetometer takes measurements of an ambient terrestrial magnetic field and is positioned so as to be sensitive to the magnetic field variations caused by the rotation of at least one partially metallic wheel of the vehicle. The magnetometer delivers a corresponding signal. The signal is processed to establish a frequency spectrum thereof. From the frequency spectrum, a frequency of rotation of the wheel is determined, and deducing therefrom, on the basis of information representative of the radius of the wheel, the speed of movement of the vehicle.

14 Claims, 3 Drawing Sheets

Figure 1:
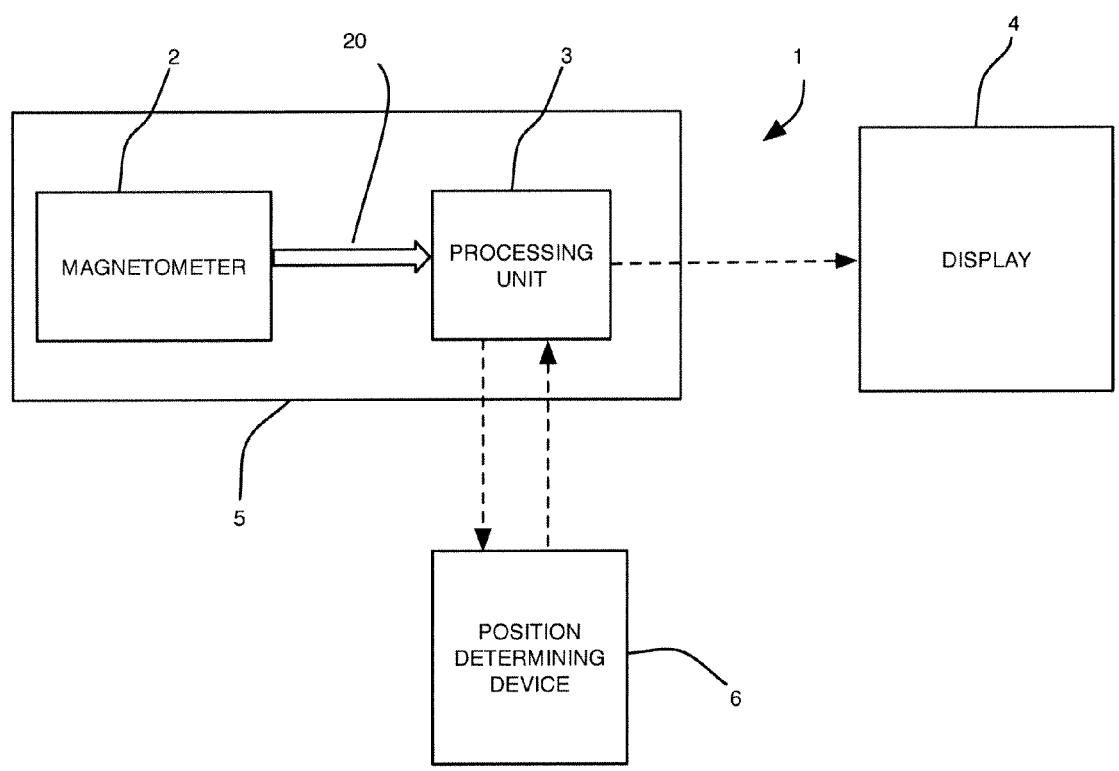

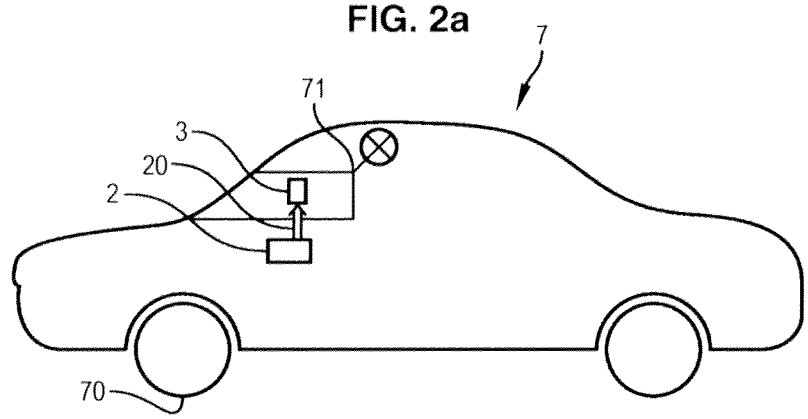
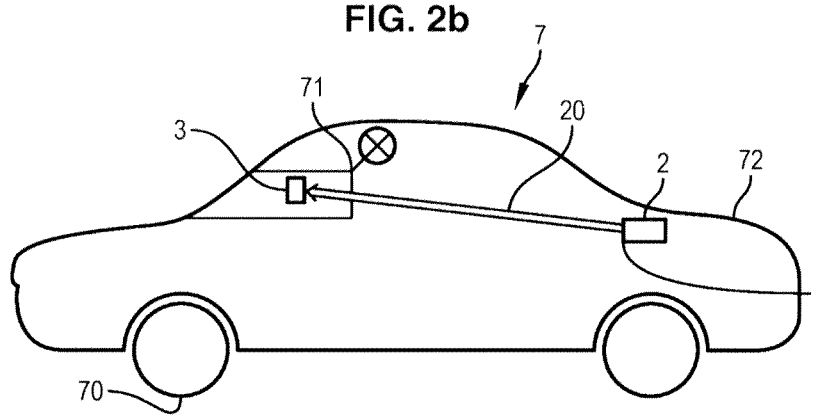
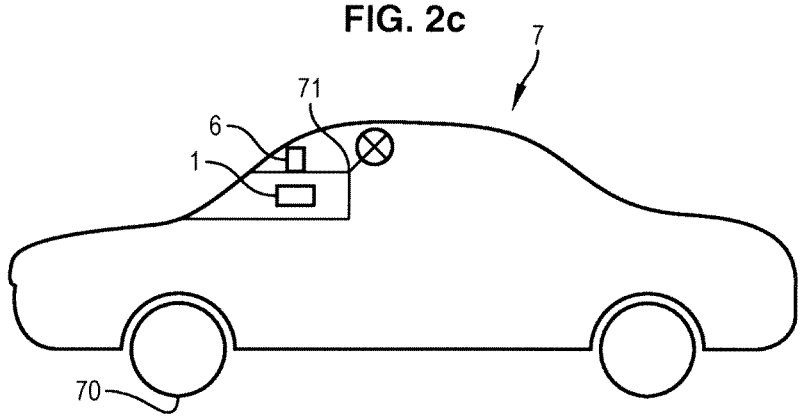

DEVICE AND METHOD FOR DETERMINING THE SPEED OF A WHEELED TERRESTRIAL VEHICLE FROM MEASUREMENTS OF AN AMBIENT TERESTRIAL MAGNETIC FIELD

This is a non-provisional application claiming the benefit of International Application Number PCT/EP2009/066642 filed Dec. 8, 2009.

The invention generally relates to the determination of the speed of movement of wheeled terrestrial vehicles by measuring the magnetic field. More particularly the invention relates to a device and a method for determining the speed of movement of wheeled terrestrial vehicles by determining a frequency of rotation of the wheels of the vehicle using a magnetometer.

A wheeled terrestrial vehicle comprises many parts with rotating or alternating movement in translation (for example for a car: wheels, pistons, crankshafts, etc.). It is known to use one or several magnetometers in order to determine a frequency of rotation of at least one of these parts and to deduce therefrom a speed of movement of the vehicle.

The most direct method consists in directly determining a frequency of rotation of a wheel, i.e. the number of revolutions per second of the wheel. It is then sufficient to multiply this frequency by the perimeter of the wheel in consideration in order to obtain the speed of movement of the vehicle.

To do this, a known method of prior art consists in fixing a magnet on the wheel and to arrange a magnetometer in the vicinity of this wheel, for example on the bodywork of the car in the mouth of the wheel.

At each rotation, the magnetometer measures a strong increase in the magnetic field due to the proximity of the magnet. Such a signal is transmitted to a processing unit.

The processing unit compares the signal representative of the magnetic field to a reference value. It provides as output, for each magnetic field measurement, a 0 or a 1 according to whether or not the measurement is less than or greater than the reference threshold value.

As such, the processing unit provides a signal with successive slots of 0 and 1, with the time between two successive 1 slots representing the duration of one revolution of the wheel in consideration. As such, the frequency of rotation of the wheel is obtained at a given instant.

However, such an approach does not provide full satisfaction. In particular:
The permanent magnet must be solidly fixed on the wheel which implies assembly constraints.
The permanent magnet can induce undesirable imbalance.
The magnetometer must be arranged very close to the permanent magnet in order to detect the magnetic field peaks. This implies additional assembly constraints, and in addition the magnetometer must be protected from inclement weather and other moving parts.

A purpose of the invention is therefore to propose an improved device for measuring a speed of movement of a wheeled terrestrial vehicle.

To this effect, the invention proposes a device for measuring the speed of movement of a wheeled terrestrial vehicle, characterised in that it comprises a magnetometer intended to take measurements of a magnetic field and positioned so as to be sensitive to the magnetic field variations caused by the rotation of at least one partially metallic wheel, as it is, of the vehicle, means for processing said measurements capable of establishing a frequency spectrum of said measurements and in determining, using said frequency spectrum, a frequency of rotation of said wheel, and of deducing therefrom, on the basis of information representative of the radius of the wheel, a speed of movement of the vehicle.

The invention is based on the surprising discovery that it is possible thanks to a developed signal processing to deduce the frequency of rotation of a wheel via a processing of the magnetic field variations induced by the metallic wheel as it is. This as such overcomes having to fix a magnet on the wheel, and there is great flexibility as to the location of the magnetometer.

Note that this discovery is not limited to the determination of the speed of a vehicle and that it is possible, by a processing of the signal similar to that described hereinafter, to follow according to time the frequency of movement of any body that periodically disturbs the terrestrial magnetic field.

This is the case in particular with at least partially metallic bodies in rotating movement or in alternating translation, for example crankshafts or the pistons in a car engine.

More generally again, a determination can thus be made of the operating speed of robots with repetitive movements in an automated assembly line, the rotating speed of a turbine or other diverse applications.

Advantageously but optionally, the device according to the invention comprises at least one of the following characteristics:
the means for processing are able to establish a frequency spectrum of the measurements of a magnetic field via a gliding-window fast Fourier transform,
the magnetometer and the means for processing are arranged separately from one another, and the device further comprises a transmission channel between them,
the magnetometer is able to measure a magnetic field according to one or more axes of measurement, and the magnetometer is arranged in such a way that the axis of rotation of the wheel is substantially parallel to one of said axes of measurement,
the magnetometer is able to measure a magnetic field according to one or more axes of measurement, and the magnetometer is arranged in such a way that the axis of rotation of the wheel is substantially perpendicular to one of said axes of measurement.

The invention also relates to a method for measuring a speed of movement of a wheeled terrestrial vehicle, characterised in that it comprises the following steps:
measuring a variable magnetic field, of which certain variations are caused by the rotation of at least one partially metallic wheel of the vehicle, as is, and
establishing a frequency spectrum of said measurements, determining, using said frequency spectrum, a frequency of rotation of said wheel, and deducing from this frequency and information representative of the radius of the wheel, a speed of movement of the vehicle.

Advantageously but optionally, the method according to the invention comprises at least one of the following characteristics:
the establishment of the frequency spectrum is carried out via a gliding-window fast Fourier transform,
the frequency of rotation of the wheel is carried out by selecting the main frequency of the frequency spectrum,
the measurements of a magnetic field are carried out according to an axis that is substantially parallel to the axis of rotation of the wheel of the vehicle, the measurements of a magnetic field are carried out according to an axis that is substantially perpendicular to the axis of rotation of the wheel of the vehicle, The invention also relates to a wheeled terrestrial vehicle comprising at least one wheel at least partially metallic, characterised in that it comprises a device for determining speed according to the invention.

Advantageously but optionally, the vehicle according to the invention comprises at least one of the following characteristics:
the magnetometer is fixed to the bodywork of the vehicle,
the vehicle comprises an instrument panel, and the magnetometer is arranged in the vicinity of the instrument panel,
the vehicle comprises a trunk and the magnetometer is arranged in the trunk.

Figure 3:
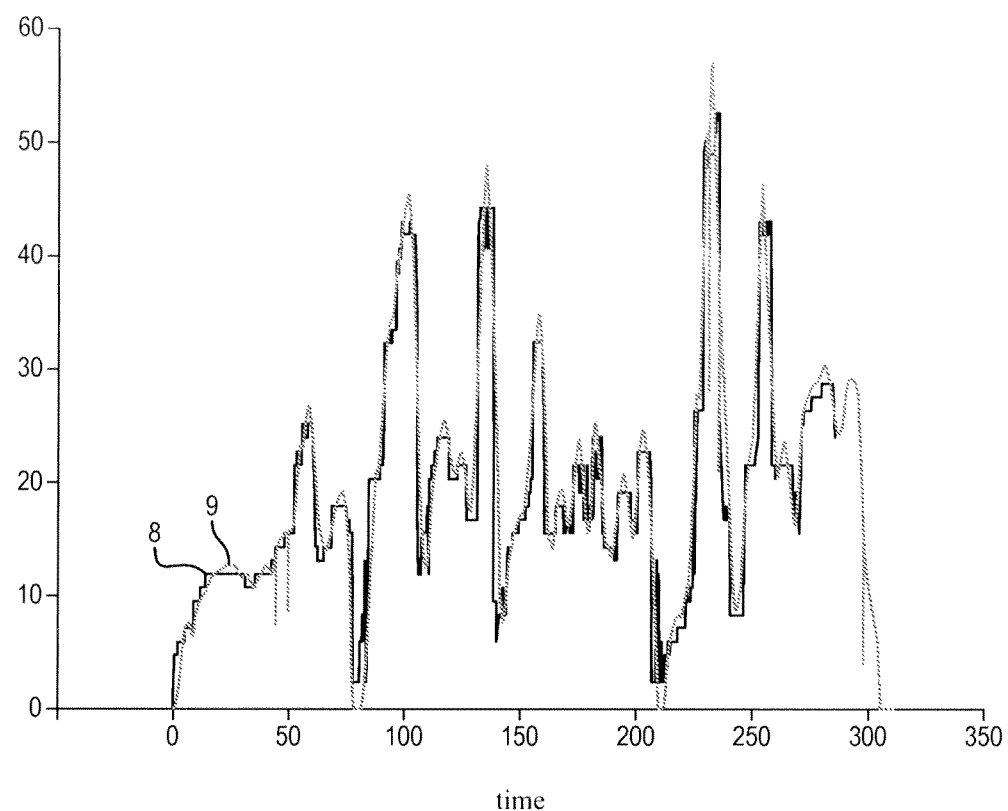

Other characteristics, purposes and advantages of this invention shall appear when reading the following detailed description, with regards to the annexed drawings, provided by way of non-restricted examples and wherein:

FIG. 1 diagrammatically shows a device for determining the speed of movement of a wheeled terrestrial vehicle by determining a frequency of rotation of the wheels of the vehicle using a magnetometer according to a possible embodiment of the invention, and FIGS. 2a to 2c each show a wheeled terrestrial vehicle provided with a device for determining speed according to a possible embodiment of the invention FIG. 3 is a graph showing the speed curve of a vehicle according to the time obtained by a device according to the invention and a speed curve reconstituted using measurements from an inertial unit mounted on the vehicle In reference to FIG. 1, a device 1 for determining the speed of movement of a wheeled terrestrial vehicle according to a possible embodiment of the invention comprises a magnetometer 2 and a data processing unit 3.

The magnetometer 2 is able to capture an ambient magnetic field and transmit a signal 20 representing the change in the magnetic field to a data processing unit 3.

The processing unit 3 establishes a frequency spectrum of the signal 20. For example a method of the "detecting the maximum autocorrelation of the signal with its delayed version" type can be used. In this method, described in one of the works of the mathematician Stéphane Mallat, if u(t) is the signal, the windowed integral of u(t)*u(t−T) is plotted and the first value of T that maximises this integral is taken. Preferably, the method used is the sliding-window fast Fourrier transform (commonly called FFT), an algorithm known for its execution speed. Any other method of signal frequency analysis known to those skilled in the art can however be used.

The processing unit 3 then determines, among the frequencies identified, the frequency of rotation of at least one metallic wheel of the vehicle. This frequency is then multiplied at the perimeter of the wheel in question in order to obtain the speed of movement of the vehicle.

It is important to note here that the wheel of the vehicle is a wheel as it is, i.e. devoid of any magnet or other magnetic part specifically intended to interact with the magnetometer.

In addition, "partially metallic wheel" means a wheel of which at least one of the constituents is at least partially made of metallic material. It can be the rim, the brake disc, a trim, or any other component rotating at the same speed as the wheel. As such, the at least partially metallic constituent causes a periodical disturbance in the magnetic field and the frequency of this perturbation is the same as that of the rotation of the wheel.

The metallic material can be constituted of steel, an aluminum alloy or any metal alloy, in particular those generally used in the construction of the constituents of a wheel.

The invention is founded on the fact that first of all the terrestrial magnetic field (of a magnitude of 0.5 gauss) is disturbed by the elements of the vehicle in periodic movement. As such, in a car with a combustion engine for example, the movement of the wheels but also of the pistons, of the crankshaft, of the transmission members, etc., cause as many periodic disturbances of which the frequencies are within the spectrum of the signal 20 transmitted by the magnetometer 2.

The invention is further founded on the fact that an appropriate treatment within the processing unit 3 is able to identify, in the frequency spectrum, the frequency of rotation of a wheel of the vehicle.

Preferably, but not in a limited manner, the identification of the frequency of rotation of a wheel is carried out by selecting the main frequency in the frequency spectrum of the signal 20, i.e. that of the highest amplitude.

Note that the magnetic field is also disturbed by the environment of the vehicle, in particular by high- and medium-frequency transmissions (starting the engine, telephone, radio).

Advantageously, the processing unit 3 is also able to filter, upstream of the frequency processing, the signal delivered by the magnetometer. Preferably, the filtering is a low-pass filtering in order to filter the high-frequency noise contained in the signal and coming from the environment of the vehicle.

Advantageously, but not in a limited manner, the magnetometer 2 has the following characteristics:
a measurement range of a magnitude of +/−2 gauss at least,
a precision of at least 1 milligauss,
a sampling frequency of the magnetic field of at least 100 Hz, and more preferably of at least 150 Hz,
in the case of a digital magnetometer, the data is provided over at least 12 bits.

Preferably, but not in a limited manner, the magnetometer 2 is a digital three-axis magnetometer of reference HMR2300 of the Honeywell® brand, directly delivering a digital signal sampling the current value of the field according to the three axes over 16 bits.

The processing unit comprises a specification containing a piece of data representative of the radius R of the wheel or of its perimeter 2*n*R.

As such, the frequency of rotation of the wheel is multiplied by the value 2*n*R in order to obtain the speed of movement of the vehicle as explained hereinabove.

Advantageously, the device 1 comprises a visualisation unit 4 in order to display in real time the value of the speed determined by the device 1.

Advantageously, the device 1 further comprises a case 5 containing the magnetometer 2 and the processing unit 3.

Preferably, but not in a limited manner, the processing unit 3 is a DSP (Digital Signal Processor). The device 1 then has the form of a case 5 of which the dimensions are from a few centimetres to a decimetre according to the three axes.

More generally, the processing unit can contain any means of calculation.

According to another possible embodiment of the invention, the magnetometer 2 and the processing unit 3 are arranged at different locations on the vehicle. The signal 20 then follows a wired transmission or a wireless transmission, for example of the Wi-fi or Bluetooth type.

Further advantageously, the data processing unit 3 and the display device 4 are combined into the same unit, or even incorporated into the instrument panel of the vehicle.

According to a possible embodiment of the invention, the device 1 is coupled to a position-determining device 6, for example of the GPS (Global Positioning System) type.

As such, when the position-determining device 6 is no longer receiving any satellite data (for example when the vehicle is passing through a tunnel), the device 1 takes the relay and provides data representative of the speed of movement of the vehicle to the position-determining device 6 which can then determine the position of the vehicle in the tunnel.

Each of the FIGS. 2a to 2c show a wheeled terrestrial vehicle 7 provided with a device 1 in order to determining its seed according to the invention.

The vehicle 7 has at least one wheel at least partially metallic 70, for example the front left wheel for a car with four wheels.

In reference to FIG. 2a and according to a possible embodiment of the invention, the magnetometer 2 of the device 1 is placed in the vicinity of the wheel 70, by being fixed to the bodywork of the vehicle 7. As such, the rotation of the wheel 70 significantly disturbs the magnetic field in the region of the magnetometer, which facilitates the determination of the frequency of rotation of the wheel in the frequency spectrum of the signal 20.

In this example, the processing unit 3 is arranged at another location on the vehicle 7. Preferably, but not in a limited manner, the vehicle 7 comprises an instrument panel 71 wherein is located the processing unit 3. Advantageously, the processing unit 3 then receives the signal 20 of the magnetometer 2 via wireless communication.

Preferably, but not in a limited manner, one of the axes of measurement of the magnetometer 2 is substantially parallel (respectively perpendicular) to the axis of rotation of the wheel 70, i.e. the two axes are parallel (or respectively perpendicular) or there is an angular separation of a magnitude of 30° at most between the axis of measurement in question and the axis of rotation of the wheel (respectively the perpendicular to the axis of rotation of the wheel).

In reference to FIG. 2b, the vehicle 7 comprises advantageously a baggage trunk 72 wherein the magnetometer 2 is arranged.

As such, the magnetometer is separated from the elements of the engine that disturb the magnetic field such as the pistons, the crankshaft, etc. These disturbances will therefore be less substantial in the signal 20.

According to another embodiment of the invention, the vehicle shown in FIG. 2c comprises an instrument panel 71 wherein is arranged the device 1 in its entirety, i.e. including the magnetometer 2. Preferably, the signal 20 is then transmitted by wired communication.

This embodiment is particularly suitable in association with the device 1 with a position-determining device 6 as described hereinabove.

Tests were carried out in order to validate the reliability of the device according to the invention.

As such, a device 1 was mounted on a vehicle equipped with a position-determining device of the GPS type. Here, the vehicle is a car on the Volkswagen® make, model Golf III TDI®.

In this example, the magnetometer 2 carried out measurements at a frequency of 154 Hz.

FIG. 3 shows a diagram of the speed of the vehicle, in km/h, according to time, in seconds.

The curve 9 shows the change in the value of the speed of the vehicle reconstituted using satellite data received by the GPS.

The curve 8 shows the change in the value of the speed determined by the device 1 according to the invention according to time. This curve is remarkably close to that obtained using the GPS.

The invention claimed is:

1. Device for measuring the speed of movement of a wheeled terrestrial vehicle, comprising:
    a magnetometer for carrying out measurements of an ambient terrestrial magnetic field and positioned in such a way as to be sensitive to the variations in the ambient terrestrial magnetic field caused by the rotation of at least one partially metallic wheel of the vehicle, and delivering a corresponding signal,
        wherein said magnetometer is disposed in a fixed, static position relative to said vehicle when said wheel is rotating,
        wherein said wheel has a radius and is devoid of any magnet or other magnetic part specifically intended to interact with the magnetometer; and
    means for processing said signal to establish a frequency spectrum of the signal, and using said frequency spectrum, to determine a frequency of rotation of said wheel, and to deduce therefrom, using the radius of the wheel, the speed of movement of the vehicle.

2. Device according to claim 1, wherein said means for processing establishes a frequency spectrum of said signal via a gliding-window fast Fourier transform.

3. Device according to claim 1, wherein the magnetometer and the means for processing are arranged separately from one another, and further comprising a transmission channel between them.

4. Device according to claim 1, wherein the magnetometer delivers a signal representative of the magnetic field according to several axes of measurement, and wherein the magnetometer is arranged in such a way that the axis of rotation of the wheel is substantially parallel to one of said axes of measurement.

5. Device according to claim 1, wherein the magnetometer delivers a signal representative of the magnetic field according to several axes of measurement, and wherein the magnetometer is arranged in such a way that the axis of rotation of the wheel is substantially perpendicular to one of said axes of measurement.

6. Wheeled terrestrial vehicle comprising at least one partially metallic wheel and a device according to claim 1.

7. Vehicle according to claim 6, wherein the magnetometer is fixed to the bodywork of the vehicle.

8. Vehicle according to claim 6, comprising an instrument panel, and wherein the magnetometer is arranged in the vicinity of said instrument panel.

9. Vehicle according to claim 6, comprising a trunk, and wherein the magnetometer is arranged in said trunk.

10. Method for measuring the speed of movement of a wheeled terrestrial vehicle, comprising:
    generating by a magnetometer a signal representative of variations in an ambient terrestrial magnetic field caused by the rotation of at least one partially metallic wheel of the vehicle, the wheel having a radius being devoid of any magnet or other magnetic part specifically intended to interact with the magnetometer, the magnetometer being disposed in a fixed, static position relative to said vehicle when said wheel is rotating, and establishing a frequency spectrum of said signal, determining, using said frequency spectrum, a frequency of rotation of said wheel, and deducing from this frequency and the radius of the wheel, the speed of movement of the vehicle.

11. Method according to claim 10, wherein the step of establishing said frequency spectrum is implemented via gliding-window fast Fourier transform.

12. Method according to claim 10, wherein the step of determining the frequency of rotation of the wheel is implemented by selecting the main frequency of the frequency spectrum.

13. Method according to claim 10, wherein said signal is representative of the magnetic field according to an axis that is substantially parallel to the axis of rotation of the wheel of the vehicle.

14. Method according to claim 10 wherein said signal is representative of the magnetic field according to an axis that is substantially perpendicular to the axis of rotation of the wheel of the vehicle.

\* \* \* \* \*